United States Patent [19]

Hashimoto et al.

[11] Patent Number: 5,956,107
[45] Date of Patent: Sep. 21, 1999

[54] DIFFUSION OPTICAL GUIDE PLATE, AND BACKLIGHT SOURCE AND LIQUID CRYSTAL DISPLAY APPARATUS USING THE SAME

[75] Inventors: Yoshito Hashimoto, Osaka; Shigeaki Mizushima, Ikoma, both of Japan

[73] Assignee: Sharp Kabushiki Kaisha, Osaka, Japan

[21] Appl. No.: 08/928,856

[22] Filed: Sep. 12, 1997

[30]  Foreign Application Priority Data

Sep. 20, 1996 [JP] Japan ................................. 8-250721

[51] Int. Cl.⁶ ..................... G02F 1/1335; G01D 11/28; F21V 7/04
[52] U.S. Cl. ................... 349/64; 349/62; 349/65; 362/26; 362/31
[58] Field of Search ................... 349/62, 64, 65, 349/112, 68; 362/26, 31

[56]  References Cited

U.S. PATENT DOCUMENTS

| 4,729,067 | 3/1988 | Ohe | 362/26 |
|---|---|---|---|
| 4,775,222 | 10/1988 | Ohe | 362/26 |
| 5,394,255 | 2/1995 | Yokota et al. | 349/64 |
| 5,521,797 | 5/1996 | Kashima et al. | 362/26 |
| 5,600,462 | 2/1997 | Suzuki et al. | 349/112 |
| 5,748,828 | 5/1998 | Steiner et al. | 349/62 |
| 5,816,677 | 10/1998 | Kurematsu et al. | 362/26 |

FOREIGN PATENT DOCUMENTS

| 5-72529 | 3/1993 | Japan . |
|---|---|---|
| 5-108023 | 4/1993 | Japan . |

Primary Examiner—William L. Sikes
Assistant Examiner—Dung Nguyen
Attorney, Agent, or Firm—David G. Conlin; Dike, Bronstein, Roberts & Cushman, LLP

[57]  ABSTRACT

The diffusion optical guide plate of this invention includes a transparent plate having the first plane, the second plane and side faces; and a light scattering controlling means for scattering incident light from said side face so as to allow the light to go out through the second plane, and transmitting incident light from said first plane so as to allow the light to go out through said second plane.

21 Claims, 5 Drawing Sheets

DIFFUSION OPTICAL GUIDE PLATE, AND BACKLIGHT SOURCE AND LIQUID CRYSTAL DISPLAY APPARATUS USING THE SAME

BACKGROUND OF THE INVENTION

1. Field of the Invention

The present invention relates to an optical guide plate used for a backlight source of a liquid crystal display apparatus. In particular, the present invention relates to a diffusion optical guide plate which can control the viewing angle characteristic of a liquid crystal display apparatus. Furthermore, the present invention relates to a backlight source and a liquid crystal display apparatus using such a diffusion optical guide plate.

2. Description of the Related Art

In general, a liquid crystal display apparatus has widely been used for numerical segment-type display apparatus such as watches, electric calculators, and the like. A liquid crystal display device which is incorporated in the liquid crystal display apparatus comprises a transparent substrate on which an active element such as a thin film transistor (TFT) is formed as a means for switching the pixel electrodes which apply voltage to the liquid crystal. The liquid crystal display apparatus further comprises a color (such as red, green, blue, etc.) filter layer as a color display means when a color display is performed.

Depending on the twist angle of the liquid crystal molecules, known display modes of a liquid crystal display apparatus include: (1) an active driving-type twisted nematic (TN) liquid crystal display mode which includes liquid crystal molecules twistedly aligned at an angle of 90°; and (2) a multiplex driving-type super twisted nematic (STN) liquid crystal display mode which includes liquid crystal molecules twistedly aligned at an angle of more than 90° and utilizing the steepness of the transmittance-applied voltage characteristics.

Since these liquid crystal display apparatus are characterized in that they are thin, light weight and consume little electric power, they have rapidly been developed in display fields (e.g., word processors, notebook-type personal computers, portable TVs, car navigation TVs, and the like) in recent years. In the future, because various images are expected to be widely used in public with the development of these portable liquid crystal display apparatus, it will be more and more important to protect personal privacy regarding these images.

According to the conventional liquid crystal display apparatus, as shown in FIG. 8, the display image of a liquid crystal display apparatus 28 can be recognized by not only an observer 29 located directly in the front of the display, but by other observers 30 and 31 located to either side (a wide viewing angle display mode). Therefore, as shown in FIG. 9, it is desirable that the viewing angle (2θ) of the liquid crystal display apparatus 28 be narrow compared to that shown in FIG. 8 for the purpose of protecting the user's personal privacy regarding the images being viewed, by providing a liquid crystal display apparatus having a structure so that only the observer 29 can clearly recognize the display image (a narrow viewing angle display mode). In other words, it is desirable that the viewing angle characteristic of the liquid crystal display apparatus can readily be varied depending upon whether the image is displayed to a large number of people, or to only an observer located directly in front of the display.

In order to respond this demand, Japanese Laid-open Patent Publication No. 5-108023 proposes a liquid crystal display apparatus having a controllable viewing angle. The liquid crystal display apparatus comprises a light shutter TN liquid crystal cell attached to a display TN liquid crystal cell. Specifically, a polarizing plate, a light shutter TN liquid crystal cell and an optical path controlling plate are formed on the light source side of the display TN liquid crystal cell, while another polarizing plate is formed on its opposite side. The display image of the display TN liquid crystal cell can be either a wide viewing angle mode or a narrow viewing angle mode for preventing viewing by observers other than the user, by switching between the open and close conditions of the light shutter TN liquid crystal cell.

However, this liquid crystal display apparatus which has a controllable viewing angle requires two liquid crystal cells (i.e., the display liquid crystal cell and the light shutter liquid crystal cell). Therefore, it is difficult for such a liquid crystal display apparatus to be fabricated to have a thin shape. Furthermore, fabrication of the liquid crystal display apparatus is complicated and provides for less efficient productivity. In addition, the liquid crystal display apparatus further requires a polarizing plate incorporated in the light shuttering TN cell, and thus has a total of three polarizing plates. Therefore, a problem arises in that the liquid crystal display apparatus provides reduced light transmittance, compared to the conventional TN and STN liquid crystal display apparatus.

Japanese Laid-open Patent Publication No. 5-72529 discloses a liquid crystal display apparatus having reduced viewing angle dependency of its characteristics. The liquid crystal display apparatus comprises an additional liquid crystal layer for controlling light scattering on one side of one of the polarizing plates, in addition to the conventional liquid crystal display device having a display mode utilizing optical rotation or birefringence (such as those of TN-mode or STN-mode, homogeneous-mode, or the like).

As described above, this liquid crystal display device requires the use of an additional liquid crystal (e.g., DSM type liquid crystals, polymer dispersed type liquid crystals, etc.) as a liquid crystal for controlling light scattering. This requirement causes an increase in production cost. The liquid crystal display apparatus which uses a scattering mode provides a very low brightness of its display image viewed from the direction vertical to the display screen, because a light transmitting the liquid crystal display apparatus is scattered at a wide angle. Thus, the liquid crystal display apparatus which uses a scattering mode cannot display the image clearly.

SUMMARY OF THE INVENTION

The diffusion optical guide plate of this invention includes a transparent plate having a first plane, a second plane and side faces; and a light scattering controlling means for scattering incident light from said side face so as to allow the light to go out through the second plane, and transmitting incident light from said first plane so as to allow the light to go out through said second plane.

In one embodiment of the invention, the light scattering controlling means is a micro unevenness formed on said first plane.

In another embodiment of the invention, the light scattering means comprises a light scattering portion in a dot matrix shape disposed on or inside said transparent plate, and a light absorbing portion or a light reflecting portion formed on the first plane corresponding to said light scattering portion.

According to another aspect of the invention, a backlight source is provided. The backlight source includes the above-described diffusion optical guide plate; a light-condensing shading slit film disposed at the first plane side of said diffusion optical guide plate; an optical guide plate disposed on the surface of said shading slit film and opposite to said diffusion optical guide plate; and light sources irradiating with light at least one side face of each of said diffusion optical guide plate and said optical guide plate.

In one embodiment of the invention, the diffusion optical guide plate and the optical guide plate have a sectional shape having a decreasing thickness from one side towards the other side, and are disposed so that the thinner side of said diffusion optical guide plate and the thicker side of said optical guide plate are located on the same side and the thicker side of said diffusion optical guide plate and the thinner side of said optical guide plate are located on the same side.

In another embodiment of the invention, the backlight source further includes an irradiation direction switching means for selectively irradiating with light either the side face of said diffusion optical guide plate or the side face of said optical guide plate.

In still another embodiment of the invention, the backlight source further includes a light source transferring means for selectively irradiating with light either the side face of said diffusion optical guide plate or the side face of said optical guide plate.

In still another embodiment of the invention, the backlight source further includes a first light source provided on the side of said diffusion optical guide plate and a second light source provided on the side of said optical guide plate, said light sources selectively irradiating with light either the side face of said diffusion optical guide plate or the side face of said optical guide plate by an on-off operation of said light sources.

According to still another aspect of the invention, a liquid crystal display apparatus is provided. The liquid crystal display apparatus includes the above-described backlight source.

The following illustrates the functions of the present invention.

The diffusion optical guide plate of the present invention comprises a transparent plate having a first plane, a second plane and side faces, and a light scattering controlling means for scattering incident light from the side face so as to allow the light to go out through the second plane and for transmitting incident light from the first plane (e.g., from a direction vertical to the first plane) so as to allow the light to go out through the second plane. When a backlight source having this diffusion optical guide plate is used for a liquid crystal display apparatus, its viewing angle can be varied in the following manner. When a light enters into the side face of the diffusing optical guide plate, the light is scattered to go out through the second plane, which results in widening the viewing angle in the display image. On the other hand, when a light enters from the first plane, the light is transmitted to go out through the second plane, which results in narrowing the viewing angle in the display image and thus allows the image to be substantially recognized only by the observer located directly in front of the liquid crystal display apparatus (i.e., 29 in FIG. 9). Therefore, according to the present invention, the viewing angle of the display image can be controlled by switching the direction of the incident light between the side face and the first plane.

This light scattering controlling means may include a micro unevenness (e.g., matte texture) formed on the first plane. Alternatively, the light scattering controlling means may comprise a light scattering portion in a dot matrix shape disposed on or inside the transparent plate, and a light absorbing portion or a light reflecting portion formed on the first plane corresponding to the light scattering portion. In the latter case, since only a portion of the incident light entered from the first plane which is not blocked by the light absorbing portion or the light reflecting portion transmits through the second plane, a viewing angle of the display image can be narrowed (i.e., controlled more effectively).

The backlight source of the present invention comprises the above-described diffusion optical guide plate, and an optical guide plate. The backlight source of the present invention can control a viewing angle of the display image by the same mechanism as that mentioned for the diffusion optical guide plate. Both the optical guide plate and the diffusion optical guide plate may have a sectional shape having a decreasing thickness from one side toward the other side (hereinafter referred to as a wedge-type sectional shape). The thickness of the backlight source can be reduced by disposing the diffusion optical guide plate and the optical guide plate so that the thinner side of the diffusion optical guide plate and the thicker side of the optical guide plate are located on the same side and the thicker side of the diffusion optical guide plate and the thinner side of the optical guide plate are located on the same side, so as to provide for a thinner liquid crystal display apparatus.

Since the liquid crystal display apparatus of the present invention comprises a backlight source having the above-described diffusion optical guide plate, the viewing angle of the display image can be controlled depending upon whether incident light enters into the side face or the first plane of the diffusion optical guide plate. For example, if a light source provided on the side of the diffusion optical guide plate is on, and another light source provided on the side of the optical guide plate located in its lower portion is off, then incident light entering from the side face of the diffusion optical guide plate is scattered to widen the viewing angle of the display image. On the other hand, if a light source provided on the side of the diffusion optical guide plate is off, and another light source provided on the side of the optical guide plate is on, then a light passes through the side face of the optical guide plate to enter into the first plane of the diffusion optical guide plate and thus transmits through the second plane without scattering. As a result, the viewing angle of the display image is narrowed compared to the case where the light source provided on the side of the diffusion optical guide plate is on. Thus, it is possible to switch the angle of vision of the transmitted light between a narrowed condition and a widened condition (i.e., to control the viewing angle of the display image) by irradiating with light either the side face of the diffusion optical guide plate or the side face of the optical guide plate.

Thus, the invention described herein makes possible the advantages of: (1) providing a diffusion optical guide plate, and a backlight source and a liquid crystal display apparatus using such a plate, which can vary a viewing angle of the display image; and (2) providing a diffusion optical guide plate which provides a thin liquid crystal display apparatus without requiring a plurality of crystal cells and therefore having improved efficiency with respect to use of light, as well as a backlight source and a liquid crystal display apparatus using such a plate.

These and other advantages of the present invention will become apparent to those skilled in the art upon reading and understanding the following detailed description with reference to the accompanying figures.

DESCRIPTION OF THE PREFERRED EMBODIMENTS

Figure 1A:
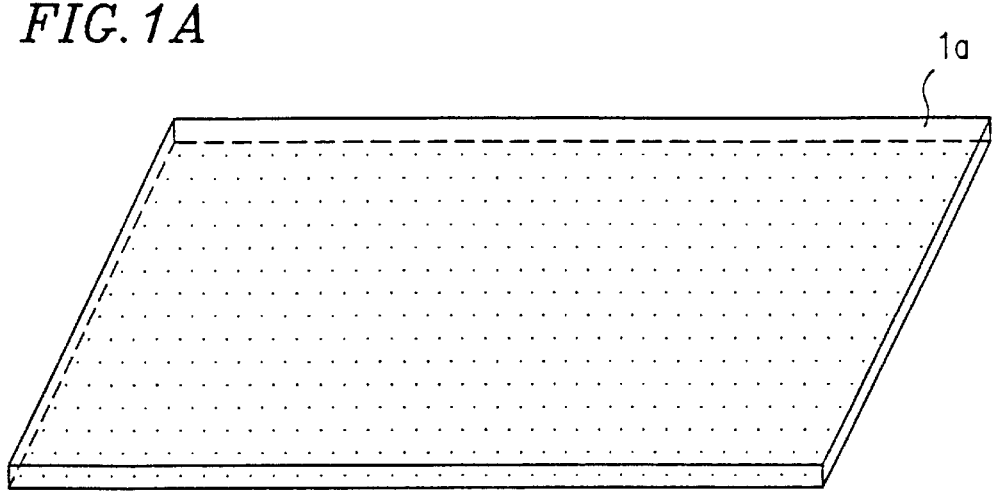
FIG. 1A is a perspective view illustrating an embodiment of the diffusion optical guide plate according to the present invention.

The following illustrates embodiments of the present invention with reference to the drawings, but the present invention is not limited to these embodiments. In the drawings, elements having the same function are represented by the same reference numeral.

Embodiment 1

FIG. 1A is a perspective view illustrating an embodiment of the diffusion optical guide plate according to the present invention The diffusion optical guide plate 1a of the present embodiment comprises a transparent plate having a first plane (the plane into which light enters; i.e., the lower plane in the present embodiment), a second plane (the plane from which light goes out; i.e., the upper plane in the present embodiment), and side faces. The transparent plate is made of, for example, a polymer resin such as acrylic resins. The diffusion optical guide plate 1a has a thickness of approximately several mm, preferably about 1 to about 5 mm. The diffusion optical guide plate 1a comprises a light scattering controlling means on the first plane. The light scattering controlling means scatters incident light from the side face of the diffusion optical guide plate 1a so as to allow the light to go out through the second plane, and transmits incident light from the first plane (e.g., from a direction vertical to the first plane) so as to allow the light to go out through the second plane.

Preferably, the light scattering controlling means is a micro unevenness formed on the first plane. For example, a matte texture can be formed by molding (such as press molding) as the micro unevenness on the first plane. The micro unevenness can be defined, for example, by surface roughness. The surface roughness of the first plane is preferably 10 to 500 μm.

Embodiment 2

Figure 1B:
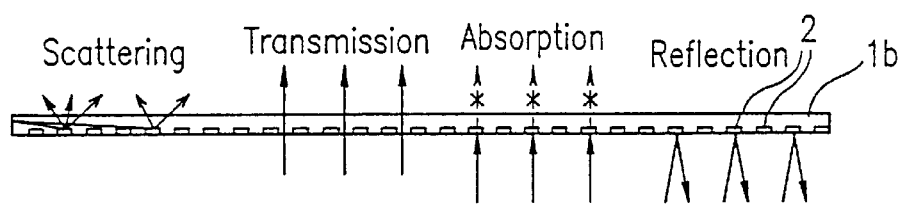
FIG. 1B is a schematic sectional view illustrating another embodiment of the diffusion optical guide plate according to the present invention.

FIG. 1B is a schematic sectional view illustrating another embodiment of the diffusion optical guide plate according to the present invention The diffusion optical guide plate 1b of the present invention comprises a transparent plate having the first plane, the second plane, and side faces. The transparent plate is made of, for example, a polymer resin such as acrylic resins. A light scattering portion 2 (made from, for example, a white scattering material) in a dot matrix shape is disposed on or inside the transparent plate. The white scattering materials include resins having a high refractive index, glasses, and the like. The white scattering material is preferably in the form of a microbead. The white scattering material is provided by any suitable method. The arrangement interval of the white scattering material (i.e., intervals between adjacent dots) may suitably be varied depending upon the applications of the diffusion optical guide plate, but is preferably about 0.5 to about 3 mm.

A light absorbing portion (made from a light absorbing material such as carbon black, black pigment or dye) or a light reflecting portion (made from a light reflecting material such as a metal film (e.g., an alminium film)) (both of which are not shown) are formed on the first plane corresponding to the light scattering portion. The light absorbing portion or the light reflecting portion is formed by any suitable method (e.g., coating).

As shown in FIG. 1B, incident light from a light source (such as fluorescent tube) which enters into the side of the transparent plate is scattered with a light scattering portion 2 to go out through the second plane (the upper side in the figure). When a light absorbing portion is formed on the first plane corresponding to the light scattering portion, incident light entering from the first plane (e.g., from a direction vertical to the first plane) is absorbed with the light absorbing portion. When a light reflecting portion is formed on the first plane corresponding to the light scattering portion, incident light entering from the first plane is reflected with the light reflecting portion. Therefore, only a portion of the incident light which is not blocked by the light absorbing portion or the light reflecting portion is transmitted to go out through the second plane.

Embodiment 3

Figure 2:
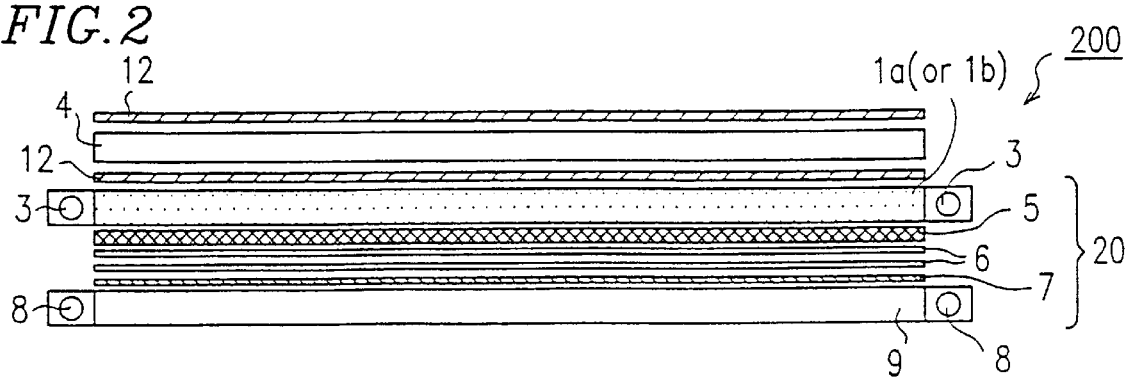
FIG. 2 is a schematic sectional view illustrating an embodiment of the liquid crystal display apparatus according to the present invention which comprises a backlight source having the diffusion optical guide plate shown in FIGS. 1A or 1B.

FIG. 2 is a schematic sectional view illustrating an embodiment of the liquid crystal display apparatus according to the present invention which comprises a backlight source having the diffusion optical guide plate shown in FIG. 1A or 1B.

A backlight source 20 comprises an optical guide plate 9 having light sources (such as fluorescent tube) 8 and 8 provided on its both sides, a scattering sheet 7 disposed on the upper portion of the optical guide plate 9, a light-condensing prism sheet 6 disposed on the scattering sheet 7, a shading slit film 5, and a diffusion optical guide plate 1a (or 1b) having light sources (such as fluorescent tube) 3 and 3 provided on its both sides. The optical guide plate 9, the scattering sheet 7, and the prism sheet 6 may have any suitable structures. Preferably, the shading slit film 5 may have a configuration that can transmit a light in only the front direction (for example, so that its visible angle can be about 10° to 20° in the horizontal direction in the paper).

The diffusion optical guide plate 1a or 1b is as illustrated above with reference to FIGS. 1A and 1B, respectively. In the present embodiment, the diffusion optical guide plate 1a or 1b is disposed so that the first plane of the plate is opposed to the shading slit film.

The liquid crystal display apparatus 200 according to the present invention comprises a backlight source 20, and a liquid crystal display device 4 disposed between polarizing plates 12 and 12. The structure of the liquid crystal display device 4 is not specifically limited so long as it is applicable to a transmission-type liquid crystal display apparatus, and any suitable structure can be used depending upon its applications.

The mechanism of controlling the viewing angle of a display image by the liquid crystal display apparatus according to the present invention is illustrated with reference to FIGS. 3A and 3B, and FIGS. 4A and 4B.

Figure 3A:
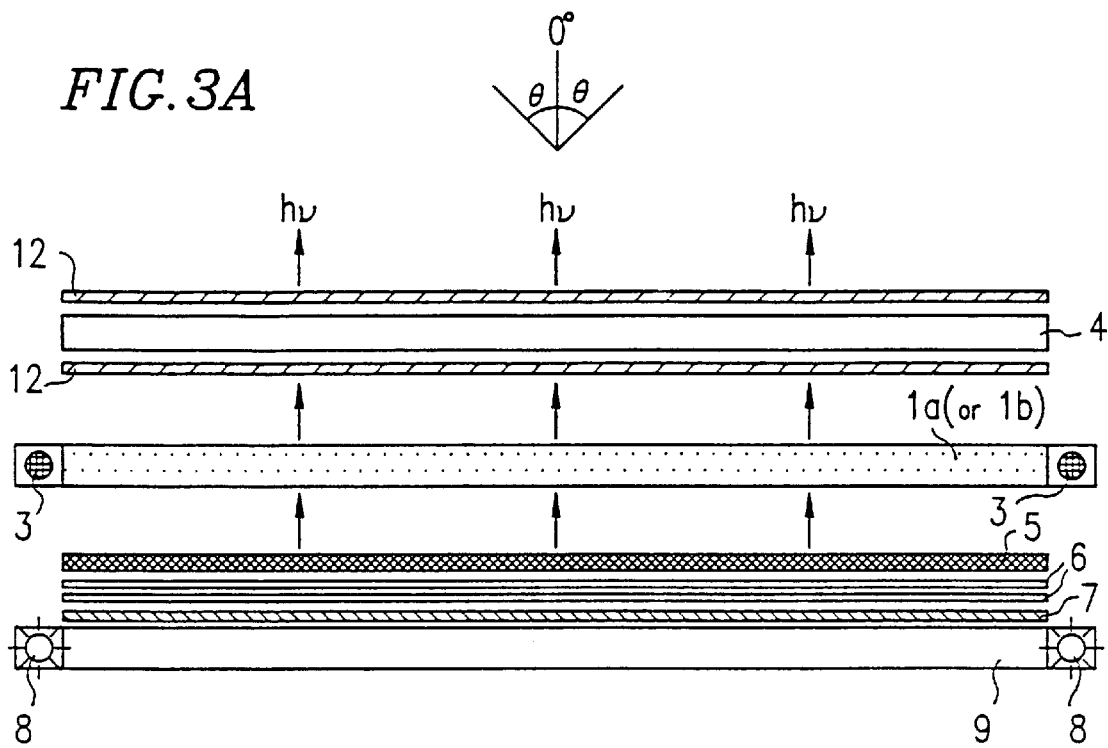
FIG. 3A is an exploded sectional view illustrating the transmittance of the light where an image is displayed in a narrowed viewing angle condition in the liquid crystal display apparatus according to the present invention.
Figure 3B:
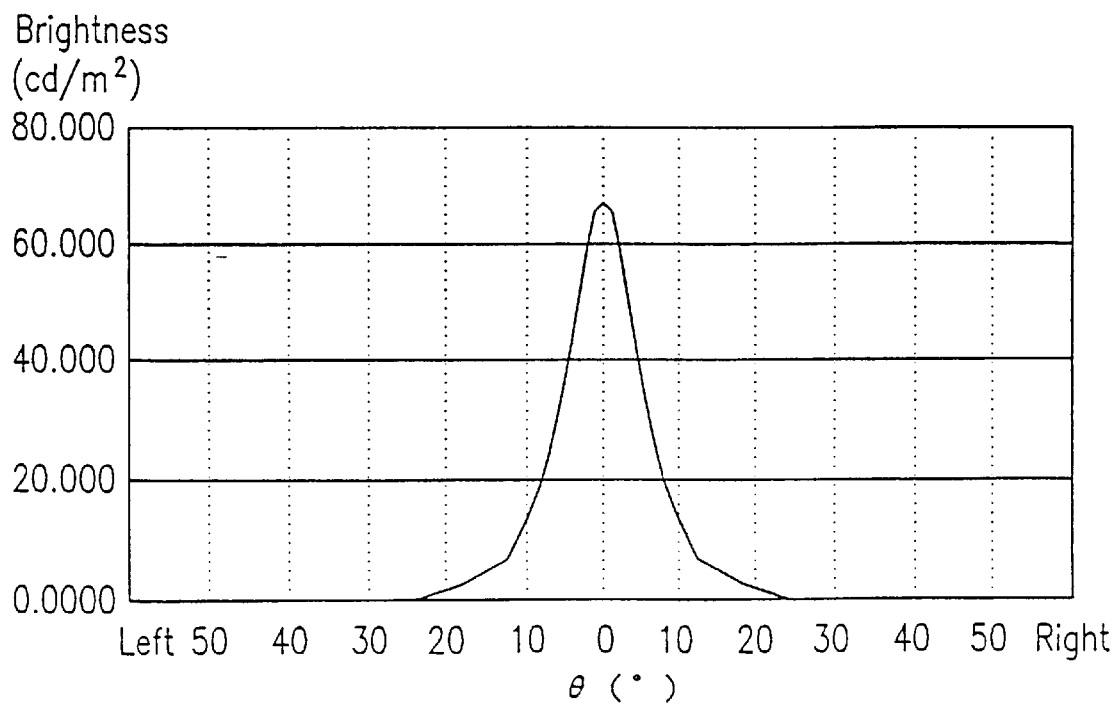
FIG. 3B is a graph showing the variation of the brightness (brightness distribution) from a direction (0°) vertical to the polarizing plate of the liquid crystal display apparatus to a θ direction of FIG. 3A in a narrowed viewing angle condition.
Figure 8:
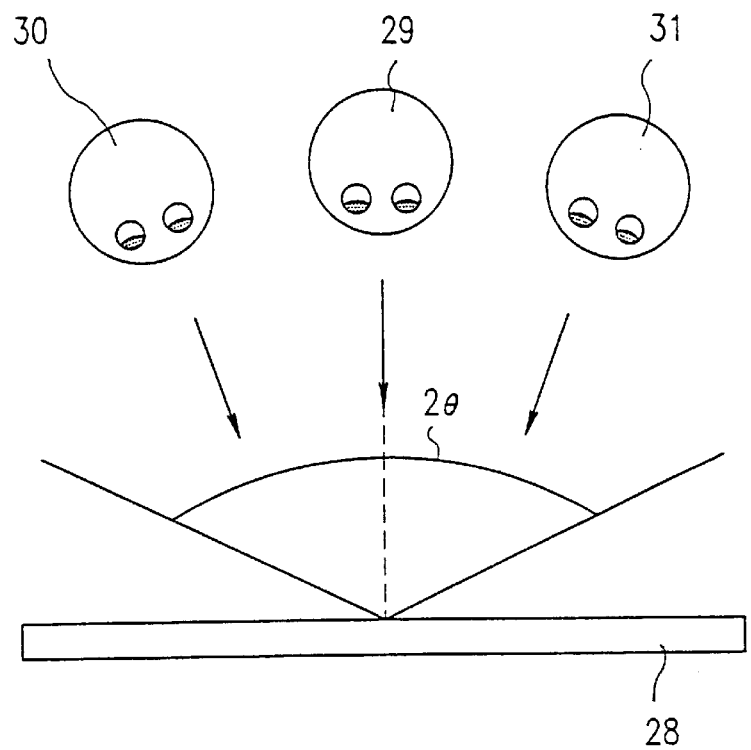
FIG. 8 is a schematic view illustrating a case where a liquid crystal display apparatus is displayed in a wide viewing angle mode.
Figure 9:
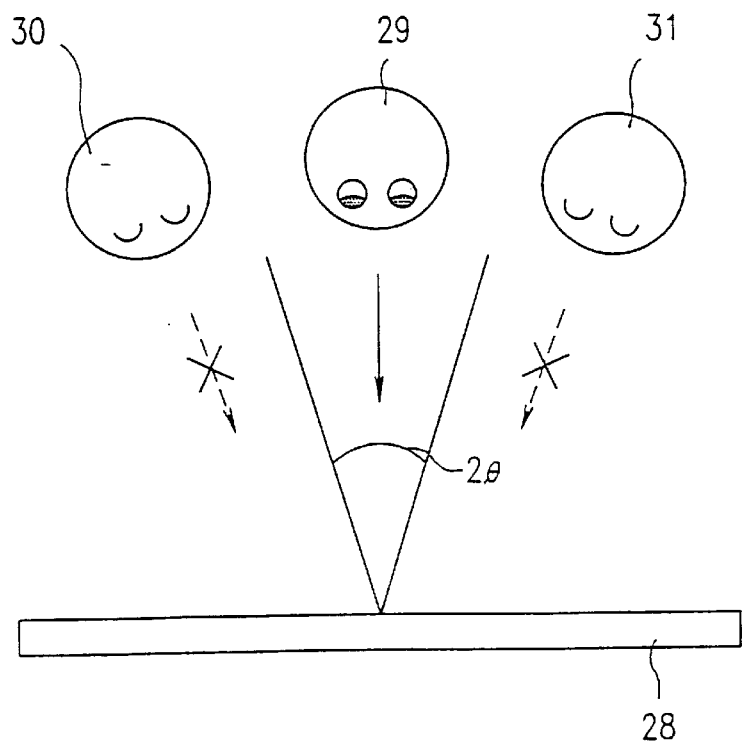
FIG. 9 is a schematic view illustrating a case where the liquid crystal display apparatus is displayed in a narrow viewing angle mode.

FIG. 3A is an exploded sectional view illustrating the transmittance of the light where an image is displayed in a narrowed viewing angle condition in the liquid crystal display apparatus according to the present invention; and FIG. 3B is a graph showing the variation of the brightness (brightness distribution) from a direction (0°) vertical to the polarizing plate of the liquid crystal display apparatus to a θ direction of FIG. 3A in a narrowed viewing angle condition. As shown in FIG. 3A, when a fluorescent tube 3 is off and a fluorescent tube 8 is on, light from the fluorescent tube 8 successively passes through the optical guide plate 9, the scattering sheet 7 and the prism sheet 6, and is blocked by the shading slit film 5 to provide a light having a narrowed visible angle of 10° to 20° in the horizontal direction with respect to orientation of the display as shown in FIG. 8 or 9. This narrowed angle light is hardly scattered even when passing through the diffusion optical guide plate 1a (or 1b), and passes through the liquid crystal display device 4 as a light having a narrowed angle of visibility of 40° to 50° (i.e., θ is 20° to 25°) in the horizontal direction. Thus, the light goes out only in the front direction, which results in a condition that a display image is clearly recognized only at an angle of 40° to 50° (i.e., θ is 20° to 25°) in the horizontal direction (i.e., a narrowed viewing angle condition). The brightness distribution is illustrated in FIG. 3B.

Figure 4A:
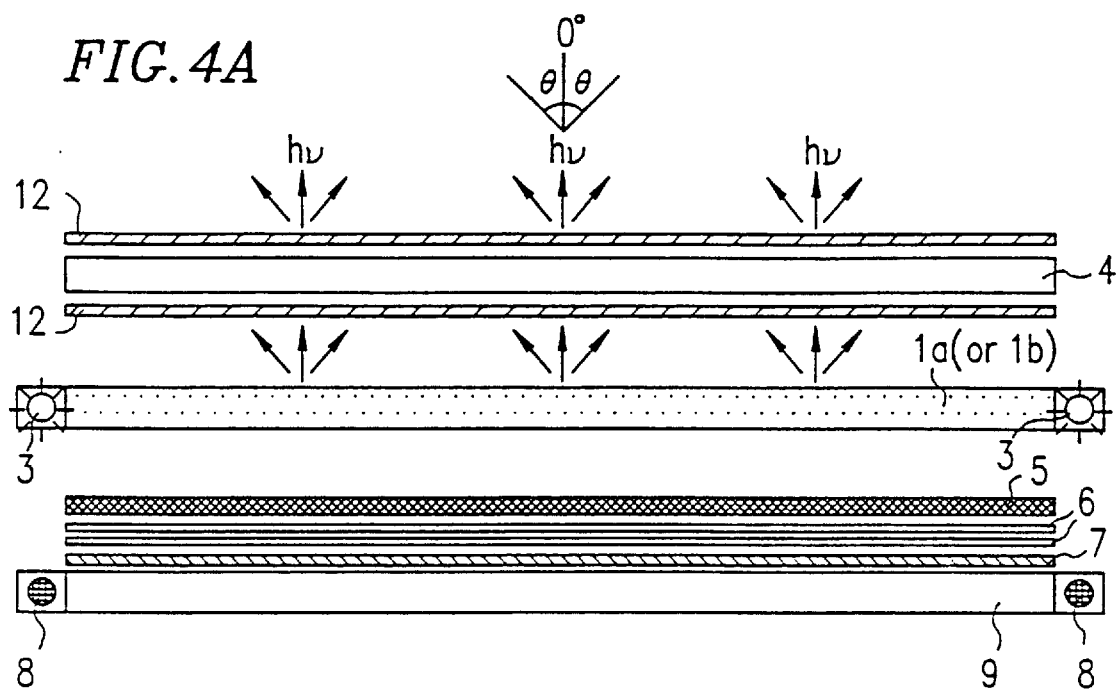
FIG. 4A is an exploded sectional view illustrating the transmittance of the light where an image is displayed in a widened viewing angle condition in the liquid crystal display apparatus according to the present invention.
Figure 4B:
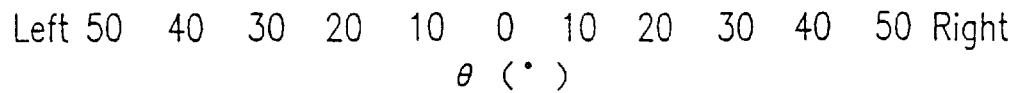
FIG. 4B is a graph showing the variation of the brightness (brightness distribution) from a direction (0°) vertical to the polarizing plate of the liquid crystal display apparatus to a θ direction of FIG. 4A in a widened viewing angle condition.

On the other hand, FIG. 4A is an exploded sectional view illustrating the transmittance of the light where an image is displayed in a widened viewing angle condition in the liquid crystal display apparatus according to the present invention; and FIG. 4B is a graph showing the variation of the brightness (brightness distribution) from a direction (0°) vertical to the polarizing plate of the liquid crystal display apparatus to a θ direction of FIG. 4A in a widened viewing angle condition. As shown in FIG. 4A, when a fluorescent tube 3 is on and a fluorescent tube 8 is off, because a light is scatterred and diffused in the diffusion optical guide plate 1a (or 1b), and thus transmitted through the liquid crystal display device 4 in directions other than the front direction, which results in a condition that an image is recognized at a wide visible angle of 80° or more (i.e., θ is 40° or more) in the horizontal direction (a widened viewing angle condition).

As can be seen from the comparison between FIG. 3B and FIG. 4B, since the light is not transmitted through the liquid crystal display device at an angle of more than 40° in the horizontal direction in a narrowed viewing angle condition as illustrated in FIG. 3B, the screen appears dark at an angle of more than 40° so as to provide a condition that the image cannot be clearly recognized. On the other hand, it is possible to recognize the image at a wide angle range in the horizontal direction in a widened viewing angle condition as illustrated in FIG. 4B.

As described above, it is possible to switch the angle of visibility of the transmitted light between a narrowed condition and a widened condition by selectively irradiating with light either the side face of the diffusion optical guide plate 1a (or 1b) or the side face of the optical guide plate 9.

According to the liquid crystal display apparatus of the present embodiment, the angle of visibility of the screen is varied wide or narrow in the horizontal direction (that is, the viewing angle of the display image can be controlled in the horizontal direction). When the liquid crystal display apparatus is rotated at an angle of 90°, the visible angle of the screen can apparently be varied by being widened or narrowed in the vertical direction (i.e., the normal direction of the paper); that is, the viewing angle of the display image can be controlled in the vertical direction.

Embodiment 4

Figure 5:
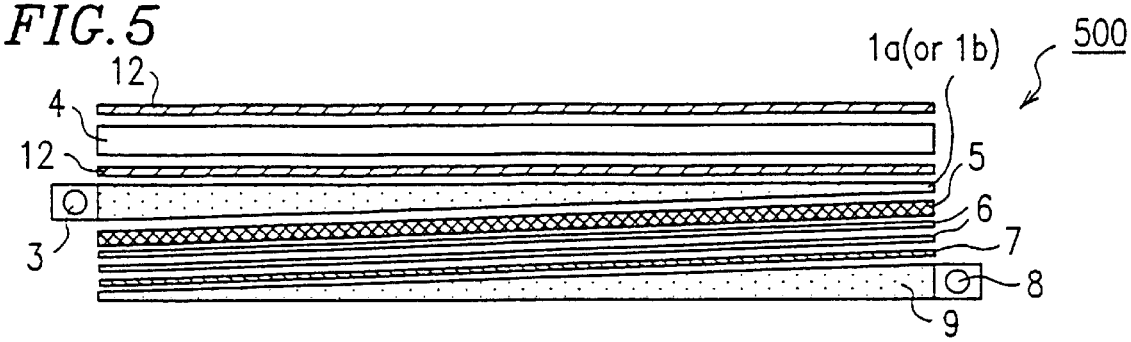
FIG. 5 is a schematic sectional view illustrating an embodiment of the liquid crystal display apparatus according to the present invention using a diffusion optical guide plate and an optical guide plate having a wedge-type sectional shape.

The following illustrates another embodiment of the present invention with reference to FIG. 5. FIG. 5 is a schematic sectional view illustrating an embodiment of the liquid crystal display apparatus according to the present invention using a diffusion optical guide plate and an optical guide plate having a wedge-type sectional shape. For simplification, only the characteristic portion of the present embodiment is illustrated below.

The liquid crystal display apparatus 500 comprises a diffusion optical guide plate 1a or 1b and an optical guide plate 9, both of which have a wedge-type sectional shape. They are disposed so that the thinner side of the diffusion optical guide plate 1a or 1b and the thicker side of the optical guide plate 9 are located on the same side, and the thicker side of the diffusion optical guide plate 1a or 1b and the thinner side of the optical guide plate 9 are located on the same side.

It is possible to switch the angle of visibility of the transmitted light between a widened condition and a narrowed condition in the liquid crystal display apparatus of the present embodiment by the same mechanism as illustrated in Embodiment 3 (i.e., by the on-off switching operation of the fluorescent tubes 3 and 8). Furthermore, the use of the diffusion optical guide plate and the optical guide plate, both of which have a wedge-type sectional shape, makes it possible to fabricate a thin liquid crystal display apparatus.

Embodiment 5

Figure 6:
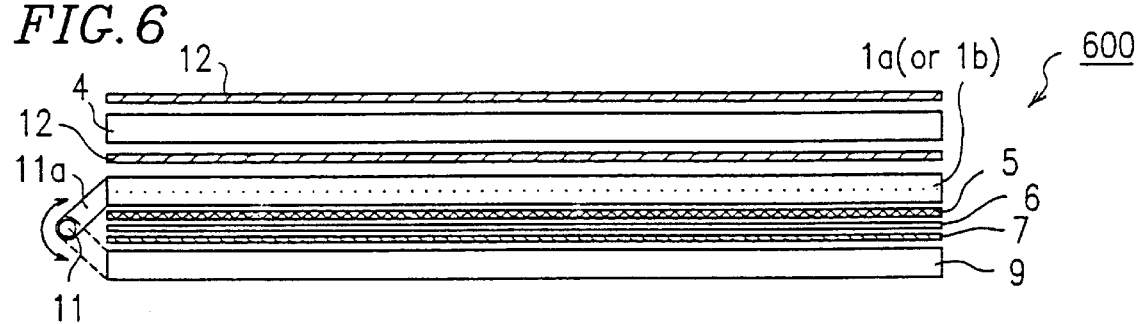
FIG. 6 is a schematic sectional view illustrating an embodiment of the liquid crystal display apparatus according to the present invention which comprises a light source and a pivotable reflection sheet.

The following illustrates still another embodiment of the present invention with reference to FIG. 6. FIG. 6 is a schematic sectional view illustrating an embodiment of the liquid crystal display apparatus according to the present invention which comprises a light source and a pivotable reflection sheet. For simplification, only the characteristic portion of the present embodiment is illustrated below.

The liquid crystal display apparatus 600 is characterized by its backlight source. Specifically, the backlight source has an irradiation direction switching means for selectively irradiating with light either the side face of the diffusion optical guide plate 1a or 1b, or the side face of the optical guide plate 9. Any suitable means can be used as the irradiation direction switching means. For example, the liquid crystal display apparatus 600 comprises a backlight source having a light source 11 and a reflective sheet 11a which can be pivoted. Either the side face of the diffusion optical guide plate 1a or 1b, or the side face of the optical guide plate 9 is selectively irradiated with light by pivoting the reflective sheet 11a at the prescribed angle and switching the irradiation direction of the light source 11. As a result, it is possible to switch the angle of visibility of the transmitted light between a narrowed condition and a widened condition (i.e., to control the viewing angle of a display image).

Embodiment 6

Figure 7:
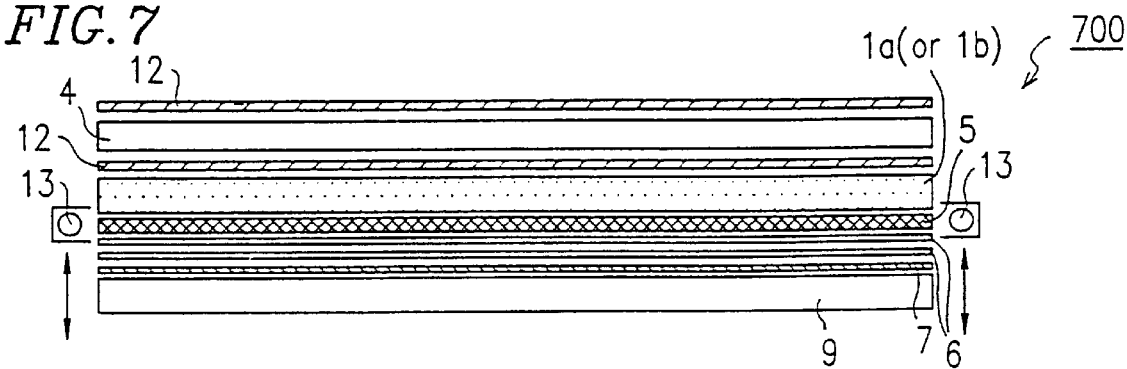
FIG. 7 is a schematic sectional view illustrating an embodiment of the liquid crystal display apparatus according to the present invention which comprises a light source transferring means.

The following illustrates still another embodiment of the present invention with reference to FIG. 7. FIG. 7 is a schematic sectional view illustrating one example of the liquid crystal display apparatus according to the present invention which comprises a light source transferring means. For simplification, only the characteristic portion of the present embodiment is illustrated below.

The liquid crystal display apparatus 700 is also characterized by its backlight source. Specifically, the backlight source has a light source transferring means for selectively irradiating with light either the side face of the diffusion optical guide plate 1a or 1b, or the side face of the optical guide plate 9. Any suitable means can be used as the light source transferring means. For example, the light source (such as fluorescent tube) 13 of the liquid crystal display apparatus 700 can be transferred (preferably, can be slid) in a vertical direction of the drawing. Either the side face of the diffusion optical guide plate 1a or 1b, or the side face of the optical guide plate 9 is selectively irradiated with light by transferring the light source 13. As a result, it is possible to switch a visible angle of the transmitted light between a narrowed condition and a widened condition (i.e., to control the viewing angle of a display image).

As described above, the present invention provides a diffusion optical guide plate comprising a light scattering controlling means. The light scattering control means scatters incident light from the side face of the diffusion optical guide plate so as to allow the light to go out through the second plane of the plate and transmits incident light from the first plane of the plate so as to allow the light to exit through the second plane. The present invention also provides a backlight source comprising the diffusion optical guide plate and an optical guide plate. It is possible to switch the angle of visibility of the transmitted light between a narrowed condition and a widened condition (i.e., to control the viewing angle of a display image) by using the diffusion optical guide plate or the backlight source for a liquid crystal display apparatus.

Furthermore, according to the present invention, the control of the viewing angle can be accomplished without using a plurality of crystal cells, which is different from the conventional liquid crystal display apparatus that is capable of controlling its viewing angle. In other words, a liquid crystal display apparatus which is capable of controlling its viewing angle can be obtained at a lower cost, since the production process is not complicated. In addition, it is not necessary to increase a number of the polarizing plates due to the lack of the necessity of using a plurality of crystal cells. As a result, since light loss is prevented according to this simple liquid crystal display apparatus, the efficiency with respect to use of light can be improved so as to provide a bright image in the liquid crystal display apparatus which is capable of controlling its viewing angle.

The present invention is applicable to any transmission type liquid crystal display apparatus.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A diffusion optical guide plate, comprising:
   a transparent plate having a first plane, a second plane and side faces; and
   a light scattering controlling means for scattering incident light from said side face so as to allow the light to go out through the second plane, and transmitting incident light from said first plane so as to allow the light to go out through said second plane,
   wherein said light scattering means comprises
      a light scattering portion in a dot matrix shape disposed on or inside said transparent plate, and
      a light absorbing portion or a light reflecting portion formed on the first plane corresponding to said light scattering portion.

2. A backlight source, comprising:
   a diffusion optical guide plate having a transparent plate having a first plane, a second plane and side faces, and a light scattering controlling means for scattering incident light from said side face so as to allow the light to go out through the second plane and transmitting incident light from said first plane so as to allow the light to go out through said second plane;
   a light-condensing shading slit film disposed at the first plane side of said diffusion optical guide plate;
   an optical guide plate disposed on the surface of said shading slit film opposite to said diffusion optical guide plate; and
   at least one light source for emitting light, the light selectively allowed to pass through either at least one side face of said diffusion optical guide plate or at least one side face of said optical guide plate, thereby varying an angle of the light passing through the second plane of the diffusion optical guide plate.

3. A backlight source according to claim 2, wherein said light scattering controlling means is a number of micro unevenness formed on said first plane.

4. A backlight source according to claim 2,
   wherein the at least one light source comprises
      a first light source and
      a second light source,
      the first light source provided on the side of said diffusion optical guide plate and
      the second light source provided on the side of said optical guide plate,
      said light sources selectively irradiating with light either the side face of said diffusion optical guide plate or the side face of said optical guide plate by an on-off operation of said light sources.

5. A backlight source, comprising:
a diffusion optical guide plate having a transparent plate having a first plane, a second plane and side faces, and a light scattering controlling means for scattering incident light from said side face so as to allow the light to go out through the second plane and transmitting incident light from said first plane so as to allow the light to go out through said second plane;
a light-condensing shading slit film disposed at the first plane side of said diffusion optical guide plate;
an optical guide plate disposed on the surface of said shading slit film opposite to said diffusion optical guide plate; and
light sources irradiating with light at least one side face of each of said diffusion optical guide plate and said optical guide plate,
wherein said light scattering controlling means comprises a light scattering portion disposed on or inside said transparent plate in a dot matrix shape, and a light absorbing portion or a light reflective portion formed on the first plane corresponding to said light scattering portion.

6. A backlight source, comprising:
a diffusion optical guide plate having a transparent plate having a first plane, a second plane and side faces, and a light scattering controlling means for scattering incident light from said side face so as to allow the light to go out through the second plane and transmitting incident light from said first plane so as to allow the light to go out through said second plane;
a light-condensing shading slit film disposed at the first plane side of said diffusion optical guide plate;
an optical guide plate disposed on the surface of said shading slit film opposite to said diffusion optical guide plate; and
light sources irradiating with light at least one side face of each of said diffusion optical guide plate and said optical guide plate,
wherein said diffusion optical guide plate and said optical guide plate have a sectional shape having a decreasing thickness from one side towards the other side, and are disposed so that the thinner side of said diffusion optical guide plate and the thicker side of said optical guide plate are located on the same side and the thicker side of said diffusion optical guide plate and the thinner side of said optical guide plate are located on the same side.

7. A backlight source, comprising:
a diffusion optical guide plate having a transparent plate having a first plane, a second plane and side faces, and a light scattering controlling means for scattering incident light from said side face so as to allow the light to go out through the second plane and transmitting incident light from said first plane so as to allow the light to go out through said second plane;
a light-condensing shading slit film disposed at the first plane side of said diffusion optical guide plate;
an optical guide plate disposed on the surface of said shading slit film opposite to said diffusion optical guide plate; and
light sources irradiating with light at least one side face of each of said diffusion optical guide plate and said optical guide plate,
further comprising an irradiation direction switching means for selectively irradiating with light either the side face of said diffusion optical guide plate or the side face of said optical guide plate.

8. A backlight source, comprising:
a diffusion optical guide plate having a transparent plate having a first plane, a second plane and side faces, and a light scattering controlling means for scattering incident light from said side face so as to allow the light to go out through the second plane and transmitting incident light from said first plane so as to allow the light to go out through said second plane;
a light-condensing shading slit film disposed at the first plane side of said diffusion optical guide plate;
an optical guide plate disposed on the surface of said shading slit film opposite to said diffusion optical guide plate; and
light sources irradiating with light at least one side face of each of said diffusion optical guide plate and said optical guide plate,
further comprising a light source transferring means for selectively irradiating with light either the side face of said diffusion optical guide plate or the side face of said optical guide plate.

9. A liquid crystal display apparatus having a backlight source, said backlight source comprising:
a diffusion optical guide plate comprising
a transparent plate having a first plane, a second plane and side faces, and
a light scattering controlling means for scattering incident light from said side face so as to allow the light to go out through the second plane and transmitting incident light from said first plane so as to allow the light to go out through said second plane;
a light-condensing shading slit film disposed at the first plane side of said diffusion optical guide plate;
an optical guide plate disposed on the surface of said shading slit film opposite to said diffusion optical guide plate; and
at least one light source for emitting light, the light selectively allowed to pass through either at least one side face of said diffusion optical guide plate or at least one side face of said optical guide plate, thereby varying an angle of the light passing through the second plane of the diffusion optical guide plate.

10. A liquid crystal display apparatus according to claim 9, wherein said light scattering controlling means is a micro unevenness formed on said first plane.

11. A liquid crystal display apparatus according to claim 9, further comprising the first light source provided on the side face of said diffusion optical guide plate and the second light source provided on the side of said optical guide plate, said light sources selectively irradiating with light either the side face of said diffusion optical guide plate or the side face of said optical guide plate by an on-off operation of said light sources.

12. A liquid crystal display apparatus having a backlight source, said backlight source comprising:
a diffusion optical guide plate comprising
a transparent plate having a first plane, a second plane and side faces, and
a light scattering controlling means for scattering incident light from said side face so as to allow the light to go out through the second plane and transmitting incident light from said first plane so as to allow the light to go out through said second plane;
a light-condensing shading slit film disposed at the first plane side of said diffusion optical guide plate;

an optical guide plate disposed on the surface of said shading slit film opposite to said diffusion optical guide plate; and light sources irradiating with light at least one side face of each of said diffusion optical guide plate and said optical guide plate, wherein said light scattering controlling means comprises a light scattering portion in a dot matrix shape disposed on or inside said transparent plate, and a light absorbing or light reflecting portion on the first plane corresponding to said light scattering portion in said first plane.

13. A liquid crystal display apparatus having a backlight source, said backlight source comprising:

a diffusion optical guide plate comprising
a transparent plate having a first plane, a second plane and side faces, and
a light scattering controlling means for scattering incident light from said side face so as to allow the light to go out through the second plane and transmitting incident light from said first plane so as to allow the light to go out through said second plane;

a light-condensing shading slit film disposed at the first plane side of said diffusion optical guide plate;

an optical guide plate disposed on the surface of said shading slit film opposite to said diffusion optical guide plate; and light sources irradiating with light at least one side face of each of said diffusion optical guide plate and said optical guide plate, wherein said diffusion optical guide plate and said optical guide plate have a sectional shape having a decreasing thickness from one side towards the other side, and are disposed so that the thinner side of said diffusion optical guide plate and the thicker side of said optical guide plate are located on the same side and the thicker side of said diffusion optical guide plate and the thinner side of said optical guide plate are located on the same side.

14. A liquid crystal display apparatus having a backlight source, said backlight source comprising:

a diffusion optical guide plate comprising
a transparent plate having a first plane, a second plane and side faces, and
a light scattering controlling means for scattering incident light from said side face so as to allow the light to go out through the second plane and transmitting incident light from said first plane so as to allow the light to go out through said second plane;

a light-condensing shading slit film disposed at the first plane side of said diffusion optical guide plate;

an optical guide plate disposed on the surface of said shading slit film opposite to said diffusion optical guide plate; and light sources irradiating with light at least one side face of each of said diffusion optical guide plate and said optical guide plate, further comprising an irradiation direction switching means for selectively irradiating with light either the side face of said diffusion optical guide plate or the side face of said optical guide plate.

15. A liquid crystal display apparatus having a backlight source, said backlight source comprising:

a diffusion optical guide plate comprising
a transparent plate having a first plane, a second plane and side faces, and
a light scattering controlling means for scattering incident light from said side face so as to allow the light to go out through the second plane and transmitting incident light from said first plane so as to allow the light to go out through said second plane;

a light-condensing shading slit film disposed at the first plane side of said diffusion optical guide plate;

an optical guide plate disposed on the surface of said shading slit film opposite to said diffusion optical guide plate; and light sources irradiating with light at least one side face of each of said diffusion optical guide plate and said optical guide plate, further comprising a light source transferring means for selectively irradiating with light either the side face of said diffusion optical guide plate or the side face of said optical guide plate.

16. A backlight source, comprising:

a diffusion optical guide plate having a first plane, a second plane and side faces;

a light-condensing means disposed at a first plane side of the diffusion optical guide plate for transmitting and condensing light toward the diffusion optical guide plate;

an optical guide plate disposed on the surface of said light-condensing means opposite to said diffusion optical guide plate; and at least one light source for emitting light, the light selectively allowed to pass through either at least one side face of said diffusion optical guide plate or at least one side face of said optical guide plate, thereby varying an angle of the light passing through the second plane of the diffusion optical guide plate.

17. The backlight source according to claim 16, wherein the diffusion optical guide plate comprises a transparent plate and a light scattering controlling means for scattering incident light from the side face so as to allow the light to pass through the second plane and transmitting incident light from said first plane so as to allow the light to pass through the second plane.

18. The backlight source according to claim 17, wherein the light scattering controlling means is a shading slit film disposed at a first plane of the diffusion optical guide plate for transmitting and condensing light toward the diffusion optical guide plate.

19. A liquid crystal display apparatus having a liquid crystal display element and a backlight source disposed to incident light through the liquid crystal display element, the backlight source comprising:

a diffusion optical guide plate having a first plane, a second plane and side faces;

a light-condensing means disposed at a first plane side of the diffusion optical guide plate for transmitting and condensing light toward the diffusion optical guide plate;

an optical guide plate disposed on the surface of said light-condensing means opposite to said diffusion optical guide plate; and at least one light source for emitting light, the light selectively allowed to pass through either at least one side face of said diffusion optical guide plate or at least one side face of said optical guide plate, thereby varying an angle of the light passing through the second plane of the diffusion optical guide plate.

20. The liquid crystal display apparatus according to claim 19, wherein the diffusion optical guide plate comprises a transparent plate and a light scattering controlling means for scattering incident light from the side face so as to allow the light to go out through the second plane and transmitting incident light from said first plane so as to allow the light to go out through the second plane.

21. The liquid crystal display apparatus according to claim 20, wherein the light scattering controlling means is a shading slit film disposed at a first plane of the diffusion optical guide plate for transmitting and condensing light toward the diffusion optical guide plate.

* * * * *